(12) United States Patent
Widmann et al.

(10) Patent No.: US 8,026,458 B2
(45) Date of Patent: Sep. 27, 2011

(54) MECHANICAL ARRANGEMENT FOR PROCESSING PIPES BY CUTTING USING A CUTTING BEAM

(75) Inventors: Dominik Widmann, Bad Liebenzell (DE); Gunter Fischer, Moensheim (DE)

(73) Assignee: Trumpf Laser- und Systemtechnik GmbH, Ditzingen (DE)

( * ) Notice: Subject to any disclaimer, the term of this patent is extended or adjusted under 35 U.S.C. 154(b) by 911 days.

(21) Appl. No.: 11/939,087

(22) Filed: Nov. 13, 2007

(65) Prior Publication Data

US 2008/0135531 A1    Jun. 12, 2008

(30) Foreign Application Priority Data

Nov. 16, 2006  (EP) .................................. 06023800

(51) Int. Cl.
*B23K 26/00* (2006.01)
*B23B 25/00* (2006.01)

(52) U.S. Cl. .... 219/121.67; 82/52; 82/113; 219/121.72; 219/121.82

(58) Field of Classification Search ............. 219/121.18, 219/121.19, 121.67, 121.7, 121.72, 121.82; 82/52, 53, 113, 901; 29/DIG. 94, DIG. 96; 408/67, 68; 409/137

See application file for complete search history.

(56) References Cited

U.S. PATENT DOCUMENTS 7,321,104 B2 *  1/2008  Wessner ................... 219/121.67
2004/0232120 A1  11/2004  Wessner

FOREIGN PATENT DOCUMENTS

| DE | 20216214 | 1/2003 |
| EP | 1454700 | 9/2004 |
| JP | 02-037982 | 2/1990 |
| JP | 04-158996 | 6/1992 |
| JP | 11-156576 A * | 6/1999 |

OTHER PUBLICATIONS

Search Report from corresponding European Application No. 06023800.3, mailed Apr. 25, 2007, 4 pages.

* cited by examiner

*Primary Examiner* — Geoffrey S Evans
(74) *Attorney, Agent, or Firm* — Fish & Richardson P.C.

(57) ABSTRACT

A mechanical arrangement for processing pipes by cutting using a cutting beam has a cutting head, a pipe holder, a catching lance and a stripper. The stripper is transferable relative to a processing axis of the cutting head in the longitudinal direction of the pipe to various positions by means of a positioning movement.

18 Claims, 7 Drawing Sheets

MECHANICAL ARRANGEMENT FOR PROCESSING PIPES BY CUTTING USING A CUTTING BEAM

CROSS REFERENCE TO RELATED APPLICATION

This application claims priority under 35 U.S.C. §119(a) to European Application No. 06 023 800.3, filed on Nov. 16, 2006, the entire contents of which are hereby incorporated by reference.

TECHNICAL FIELD

The invention relates to mechanical arrangements for processing pipes by cutting using a cutting beam.

BACKGROUND

One known mechanical arrangement for processing pipes by cutting using a cutting beam includes a cutting head, a pipe holder, a catching lance and a stripper. The cutting beam may be directed from the cutting head onto a pipe to be processed, along a processing axis of the cutting head, which axis forms the cutting beam axis when the cutting beam is switched on and is in the transverse direction of the pipe. The cutting beam and the pipe are movable relative to each other in the circumferential direction of the pipe, with at least one pipe portion being severed. The pipe holder, viewed in the longitudinal direction of the pipe, is disposed on one side of the processing axis of the cutting head and is provided for fixing the pipe to be processed. The stripper is disposed on that side of the processing axis of the cutting head which is opposite the pipe holder in the longitudinal direction of the pipe. The catching lance is insertable into the interior of the pipe to be processed on that side of the processing axis of the cutting head which is opposite the pipe holder in the longitudinal direction of the pipe and may in so doing be arranged with a projecting length relative to the stripper in the longitudinal direction of the pipe and towards the processing axis of the cutting head. The at least one severed pipe portion may be deposited on the catching lance on the side of the stripper which is towards the processing axis of the cutting head, and the pipe portion(s) deposited on the catching lance may be stripped off the catching lance by the stripper by virtue of the catching lance being movable relative to the stripper in the longitudinal direction of the pipe with a withdrawal movement away from the processing axis of the cutting head.

A mechanical arrangement of the kind described above is sold by the company TRUMPF©, 71254 Ditzingen, Germany, under the product name TUBEMATIC® RC. It is known in the prior art, to use such a device, with a laser cutting beam produced in a laser cutting head, for the cutting of pipe portions from long metal pipes. For that purpose, the pipe to be processed is clamped by a longitudinal end in a chuck that is rotatable about the axis of the pipe and which is for its part mounted on a feed carriage which is displaceable in the longitudinal direction of the pipe. To sever the individual pipe portions, the pipe to be processed is repositioned by displacing the feed carriage relative to the laser cutting head in the longitudinal direction of the pipe by the respective pipe portion length. During the repositioning movement of the pipe to be processed, the laser cutting head is in its inoperative state. Following a repositioning movement, the laser cutting beam is directed onto the pipe to be processed and the pipe is rotated about the pipe axis by rotating the chuck disposed on the feed carriage. By that means the laser cutting beam makes a continuous severing cut in the circumferential direction of the pipe. On the side of the laser cutting head which is opposite the chuck and the feed carriage in the longitudinal direction of the pipe, a catching lance in the form of a so-called "catcher" is arranged. The catcher is a cooling and/or flushing lance of the kind described in detail in EP 1 454 700 A1.

Before processing of a pipe by cutting is commenced, the catcher, mounted on a catcher slide, is moved relative to the laser cutting head in the longitudinal direction of the pipe into a working position. Once the catcher is in the working position, the processing axis of the laser cutting head extends through a collecting aperture made in the wall of the catcher. Between the laser cutting head and the catcher slide, a stripper is rigidly mounted on the machine bed of the prior-known arrangement, i.e. is mounted such that its position does not change. When the catcher is in the working position, the stripper is arranged close to the catcher slide and the catcher passes through it in the longitudinal direction of the pipe.

When the pipe to be processed is being positioned in the longitudinal direction of the pipe prior to the making of a severing cut, the catcher runs into the interior of the pipe at the longitudinal end of the pipe facing it. Metal spatter produced in the interior of the pipe during the cutting operation passes through the collecting aperture in the wall of the catcher into the interior of the catcher and is removed therefrom. When the severing cut has been completed, the severed pipe portion is deposited under the action of gravity on the catcher. With the laser cutting beam switched off, the pipe to be processed is then repositioned by displacing the feed carriage in the longitudinal direction of the pipe. The end of the pipe that is the leading end in the repositioning operation shifts the pipe portion already deposited on the catcher in the direction towards the catcher slide. If a second severing cut is now made, the pipe portion severed in the process is also deposited on the catcher. These procedures may be repeated until the entire length of the catcher is occupied by pipe portions threaded onto it. The catcher slide then travels, together with the catcher mounted on it, in the longitudinal direction of the pipe away from the laser cutting head. The pipe portions threaded on the catcher are consequently stripped off the catcher by the stripper mounted in a fixed position on the machine bed of the prior-known arrangement and fall onto an unloading ramp where they are finally removed from the vicinity of the mechanical arrangement.

SUMMARY

The mechanical arrangements disclosed herein render flexible processing of pipes possible while providing a work sequence that is optimized in terms of time. To this end, a stripper is provided that may be variably positioned relative to the processing axis of the cutting head. This allows the projecting length of the catching lance, when in its working position, to be adjusted relative to the stripper on the cutting head side to suit changing processing conditions.

Accordingly, in one aspect the invention features A mechanical arrangement for processing pipes by cutting using a cutting beam, including (a) a cutting head from which a cutting beam may be directed onto a pipe to be processed, along a processing axis of the cutting head and in the transverse direction of the pipe, and the cutting beam and the pipe are movable relative to each other in the circumferential direction of the pipe with at least one pipe portion being severed, (b) a pipe holder which, viewed in the longitudinal direction of the pipe, is disposed on one side of the processing axis of the cutting head and is configured to fix the pipe to be processed, (c) a stripper, disposed on a side of the processing axis of the cutting head which is opposite the pipe holder in the longitudinal direction of the pipe, and (d) a catching lance that is insertable into the interior of the pipe to be processed, on a side of the processing axis of the cutting head which is opposite the pipe holder in the longitudinal direction of the pipe and may in so doing be arranged with a projecting length relative to the stripper in the longitudinal direction of the pipe and towards the processing axis of the cutting head. The catching lance is configured to receive at least one severed portion of the pipe on the side of the stripper which is towards the processing axis of the cutting head, and is movable relative to the stripper in the longitudinal direction of the pipe with a withdrawal movement away from the processing axis of the cutting head, to strip the pipe portions off the catching device. The stripper is transferable relative to the processing axis of the cutting head in the longitudinal direction of the pipe to various positions by a positioning movement.

To optimize the work sequence in terms of time, the projecting length of the catching lance, when in its working position, relative to the stripper on the cutting head side is preferably at most negligibly longer than is absolutely necessary to allow the catching lance to receive the pipe portion (s) which are to be stripped off the catching lance in an unloading operation. Optimization for that purpose of the projecting length of the catching lance relative to the stripper entails minimization of the distance over which the catching lance has to be moved in the withdrawal direction in order for the pipe portion(s) threaded on the catching lance to be stripped off. Minimization of the distance traveled in the withdrawal movement of the catching lance results in turn in a minimization of the unloading time required for discharging the pipe portions that have been made, which unloading time represents, at least to some extent, non-processing time.

If catching lances of differing lengths may be used in the mechanical arrangement, the positionability of the stripper ensures that the maximum catching lance length can be made available on each of the different-length catching lances for the threading-on of severed pipe portions. If a long catching lance provided for the processing of large-diameter pipes is to be replaced by a short catching lance as is used in the processing of small-diameter pipes, the stripper may be transferred, in adaptation to the length of the catching lance, from a position assigned to the large catching lance length, which is remote from the cutting head, to a position matched to the short catching lance, which is close to the cutting head. Conversely, when a short catching lance is being exchanged for a long catching lance, the stripper may be transferred from a position close to the cutting head to a position remote from the cutting head. Both positions of the stripper are preferably to be selected such that the resulting projecting length of the respective catching lance relative to the stripper on the cutting head side is a minimum projecting length that will still allow the threading-on of severed pipe portions. In that manner, the number of unloading operations and the associated non-processing times may be reduced to a minimum irrespective of the length of the catching lance in use.

The arrangements disclosed herein also allow changing unloading strategies to be implemented in an optimized manner. For example, the constitution of a severed pipe portion, especially its wall thickness and/or the contour of its ends, may make it necessary for that pipe portion to be unloaded individually. If the projecting length of the catching lance relative to the stripper on the cutting head side were in that case at a maximum, only a relatively small proportion of the projecting length of the catching lance on the cutting head side would be occupied by the pipe portion to be unloaded. Nevertheless, the catching lance would have to be moved in the withdrawal direction over the entirety of the projecting length in order for the pipe portion to be stripped off. The unloading time required and hence also the resulting non-processing time would consequently be longer than is absolutely necessary. The movability of the stripper in accordance with the invention allows the unloading time and the associated non-processing time to be reduced in processing situations of the kind described. Thus, in the case of the invention, the stripper may be positioned in the longitudinal direction of the pipe such that, on the cutting head side, a projecting length of the catching lance is obtained that is adapted to the length of the pipe portion that is to be unloaded individually. For unloading of the pipe portion, the catching lance then needs to be moved in the withdrawal direction merely over the reduced projecting length.

In some implementations, a longitudinal stripper guide is provided for the stripper. The longitudinal stripper guide simplifies the transfer of the stripper to various positions relative to the processing axis of the cutting head. It ensures a defined positioning motion of the stripper in the longitudinal direction of the pipe.

The longitudinal stripper guide and a longitudinal catching lance guide may share a longitudinal guide device provided on a support structure of the arrangement. The dual use of the longitudinal guide device on the support structure side is advantageous in various respects. Examples to be mentioned are advantages in terms of construction and assembly. Furthermore, the longitudinal guide devices on the stripper side and the catching lance side, which cooperate with the longitudinal guide device on the support structure side, may be arranged close to one another in the longitudinal direction of the pipe. Consequently, the projecting length, on the cutting head side, of the catching lance provided with the longitudinal guide device on the catching lance side, relative to the stripper provided with the longitudinal guide device on the stripper side may be maximized. Alternatively, it is possible to obtain a predetermined projecting length of the catching lance relative to the stripper with a minimum length of catching lance. Small catching lance lengths are advantageous inasmuch as the removal, for example, of material spatter produced at the processing site of the cutting beam, which takes place through the interior of the catching lance, becomes easier the shorter the catching lance. Small catching lance lengths are to be preferred also from the point of view of the stability and rigidity of the catching lance. Catching lances are cantilever-like components, whose ability to function is considerably dependent on a sufficient inherent rigidity and on sufficiently stable mounting of the catching lance. In that respect, however, small catching lance lengths can be controlled better than large catching lance lengths.

The longitudinal guide device may be used on the support structure side. In this case, the longitudinal guide device on the support structure side also forms part of a longitudinal drive guide by means of which a drive unit connected to the catching lance is guided during its movement in the longitudinal direction of the pipe.

Any or all of the longitudinal stripper guide, the longitudinal catching lance guide, and the longitudinal drive guide of the arrangement may advantageously be in the form of a linear guide. The linear guides are preferably standard machine elements that allow the required positioning accuracy to be guaranteed without any problems.

The positioning movement of the stripper may be performed manually, or, alternatively, a motor-powered positioning drive may be provided for the stripper. By using a motor-powered positioning drive it is possible to increase the degree of automation of the arrangement. In addition, the arrangement may include a motor-powered catching lance drive. With a view to obtaining, in particular, a structurally simple layout of the arrangement as a whole, the two drives may share a drive device which is for its part provided on a support structure of the mechanical arrangement. A shared drive device on the support structure side may, for example, include a rack which may be engaged both by a drive pinion of the motor-powered positioning drive for the stripper and by a drive pinion of the motor-powered catching lance drive.

The various positions to which the stripper may be transferred by a positioning movement in the longitudinal direction of the pipe may be defined with the aid of a numerical positioning control. Such a positioning control may be used both in the case of manual drive and in the case of motor drive of the positioning movement of the stripper. In the case of manual positioning of the stripper, the numerical positioning control may, for example, specify the position to which the stripper is to be moved by hand. When a motor-powered positioning drive is used, by controlling the drive motor for the stripper the numerical positioning control is able to effect exact positioning of the stripper in the longitudinal direction of the pipe.

The numerical positioning control of the stripper may be integrated into a higher-level numerical arrangement control. The positioning of the stripper in the longitudinal direction of the pipe may consequently be adapted in an automated manner to other functions of the mechanical arrangement. For example, the position to which the stripper is to be transferred in the longitudinal direction of the pipe may be defined as a function of the overall length of the pipe portions to be stripped off the catching lance in an unloading operation, which overall length is stored in the arrangement control.

The positions to which the stripper has been transferred in the longitudinal direction of the pipe can be detected by a numerical control of the arrangement. The detected positions of the stripper are then used as a basis for the control of other functions of the arrangement. For example, the movement of the catching lance in the longitudinal direction of the pipe may be controlled taking into account the position adopted by the stripper in the longitudinal direction of the pipe.

The details of one or more embodiments of the invention are set forth in the accompanying drawings and the description below. Other features and advantages of the invention will be apparent from the description and drawings, and from the claims.

DESCRIPTION OF DRAWINGS

The invention is described in detail below with reference to illustrative schematic drawings, in which.

Like reference symbols in the various drawings indicate like elements.

DETAILED DESCRIPTION

Figure 1A:
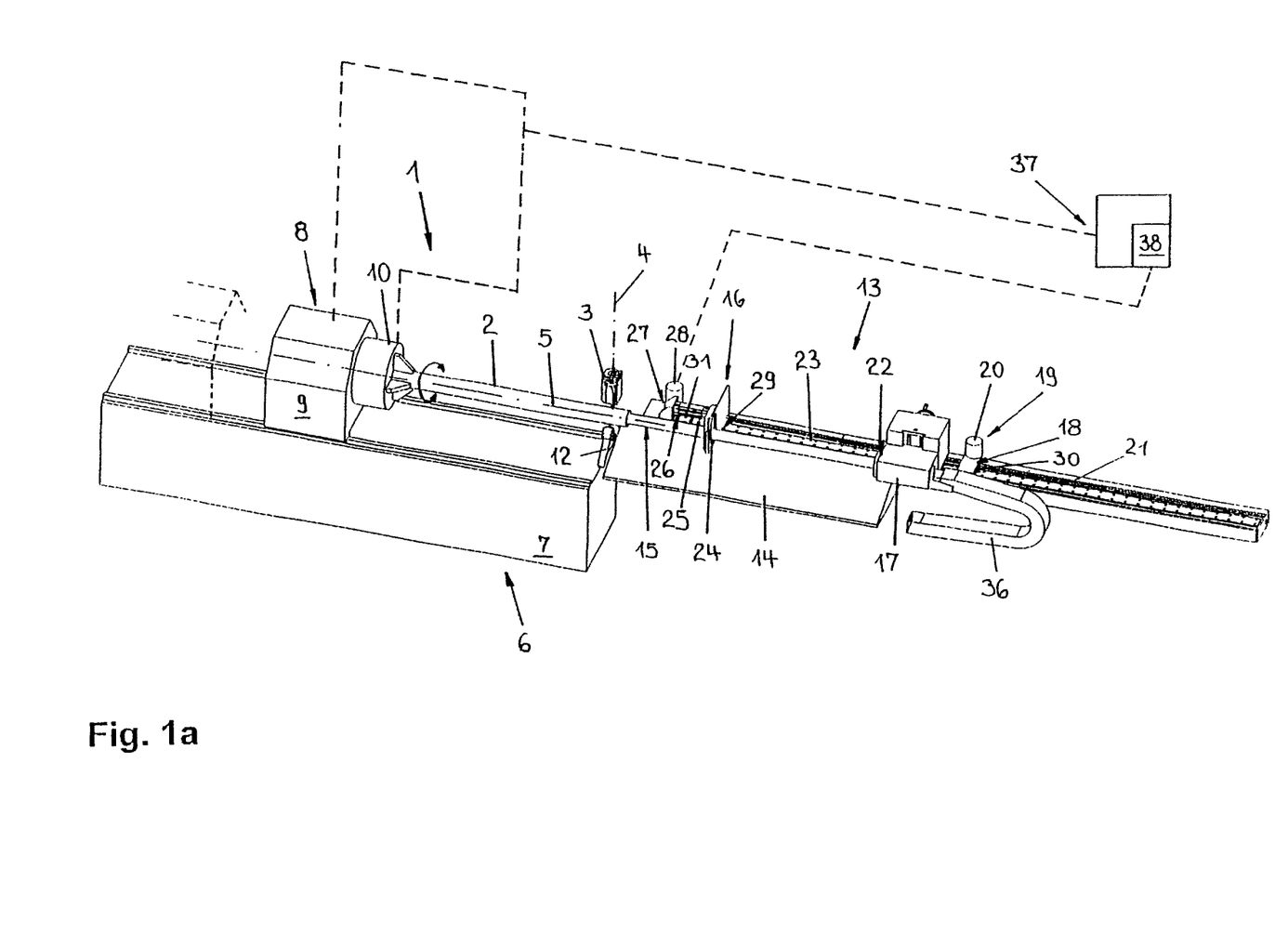
FIGS. 1a, 1b and 1c show a mechanical arrangement for processing pipes by cutting, with a long catching lance and a motor-powered stripper drive, in various phases of a first pipe-processing operation.

As shown in FIG. 1a, a mechanical arrangement is in the form of a laser cutting machine 1 for processing pipes 2. Other than as illustrated, it is also possible for pipes having a cross-section that differs from a circular shape to be processed by means of the laser cutting machine 1.

The laser cutting machine 1 has a cutting head in the form of a laser cutting head 3 from which a laser cutting beam may be directed onto the pipe 2 in the transverse direction of the pipe. The course taken by the laser cutting beam is illustrated by a processing axis 4 of the laser cutting head 3. When the laser cutting beam is switched on, the processing axis 4 of the laser cutting head 3 coincides with the axis of the laser cutting beam. A dot-dash line 5 in FIG. 1a shows the longitudinal direction of the pipe 2.

The laser cutting head 3 is mounted, in a manner not shown in detail, on a support structure of the laser cutting machine 1 in the form of a machine bed 6. The position of the cutting head 3 is adjustable in the radial direction of the pipe 2. Part of the machine bed 6 is formed by a parallel guide 7 for a pipe holder in the form of a rotating/feed station 8. The rotating/feed station 8 comprises a feed carriage 9, which is displaceable in the longitudinal direction 5 of the pipe on the parallel guide 7, and a chuck 10, which is rotatable on the feed carriage 9 about the axis of the pipe 2 extending in the longitudinal direction 5 of the pipe. At the chuck 10, the pipe 2 is clamped therein by its longitudinal end remote from the laser cutting head 3. The directions of rotation of the chuck 10 and of the pipe 2 are indicated by a double-headed arrow 11. Beneath the laser cutting head 3, the pipe 2 is supported on ball bearings on a pipe support 12.

On the side of the processing axis 4 of the laser cutting head 3 remote from the rotating/feed station 8, the laser cutting machine 1 has an unloading device 13. Part of the unloading device 13 is formed by an unloading ramp 14. The unloading device 13 further comprises a catching lance, in the form of a catcher 15, and a stripper 16. The catcher 15 is mounted on a catching lance holder in the form of a catcher slide 17 and projects therefrom in the direction towards the rotating/feed station 8. The catcher slide 17 is coupled to a drive unit 18 of a motor-powered catching lance or catcher drive 19. The drive unit 18 of the catcher drive 19 has an electric drive motor 20. The latter drives a drive pinion, not shown in detail in the drawings, which for its part engages a drive rack 21. The drive rack 21 is mounted on another part of the machine bed 6 and to that extent forms a drive device of the motor-powered catcher drive 19 on the support structure side.

By means of the motor-powered catcher drive 19, the catcher slide 17 is displaceable together with the catcher 15 in the longitudinal direction 5 of the pipe. During its displacement, the catcher 15 is guided by a longitudinal guide 22 for the catching lance or catcher. The longitudinal catcher guide 22 is a conventional linear guide comprising, as a longitudinal guide device on the support structure side, a guide rail 23 which is mounted on the other part of the machine bed 6 on which the drive rack 21 is mounted. A longitudinal guide device of conventional construction disposed on the catching lance or catcher side and provided on the catcher slide 17 cooperates in customary manner with the guide rail 23.

The stripper 16 is of a plate-like configuration and has a passage 24 through which the catcher 15 passes in FIG. 1a. A stripper slide 25 provided with the stripper 16 is coupled to a drive unit 26 of a motor-powered stripper drive 27 which serves as a positioning drive. The drive unit 26 of the motor-powered stripper drive 27 comprises an electric drive motor 28. The latter drives a drive pinion (not shown) which for its part meshes with an opposite set of teeth of the drive rack 21. Accordingly, the drive rack 21 forms, on the support structure side, a drive device that is shared by the motor-powered catcher drive 19 and the motor-powered stripper drive 27.

By means of the motor-powered stripper drive 27, the stripper slide 25 is displaceable with the stripper 16 in the longitudinal direction 5 of the pipe inter alia relative to the laser cutting head 3. To guide the stripper slide 25 and stripper 16 during movement thereof in the longitudinal direction 5 of the pipe, a longitudinal stripper guide 29 is used. The longitudinal stripper guide 29 also is a conventional linear guide. It comprises a longitudinal guide device of conventional construction on the stripper side, provided on the stripper slide 25, and, as a longitudinal guide device on the support structure side, the guide rail 23 which at the same time forms the longitudinal guide device of the longitudinal catcher guide 22 on the support structure side. The guide rail 23 moreover also serves as a longitudinal guide device, disposed on the support structure side, of a longitudinal drive guide 30 of the drive unit 18 of the motor-powered catcher drive 19 and as a longitudinal guide device, disposed on the support structure side, of a longitudinal drive guide 31 of the drive unit 26 of the motor-powered stripper drive 27.

Figure 4:
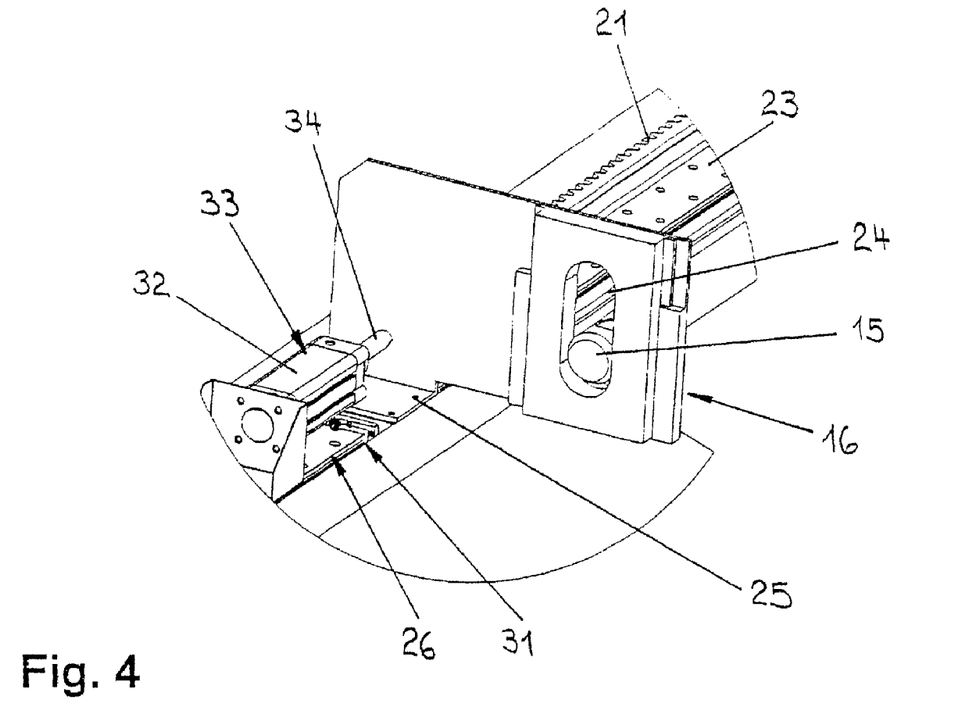
FIG. 4 shows the detail D in FIG. 2b, viewed in the direction of the arrow III in FIG. 2b.

Mounted on the drive unit 26 of the motor-powered stripper drive 27, beside the electric drive motor 28, there is a cylinder 32 of an overload protection device 33 provided for the stripper 16 (FIG. 4). A piston guided in the interior of the cylinder 32 is connected to the stripper 16 via a piston rod 34 which can be seen in FIG. 4.

Figure 2A:
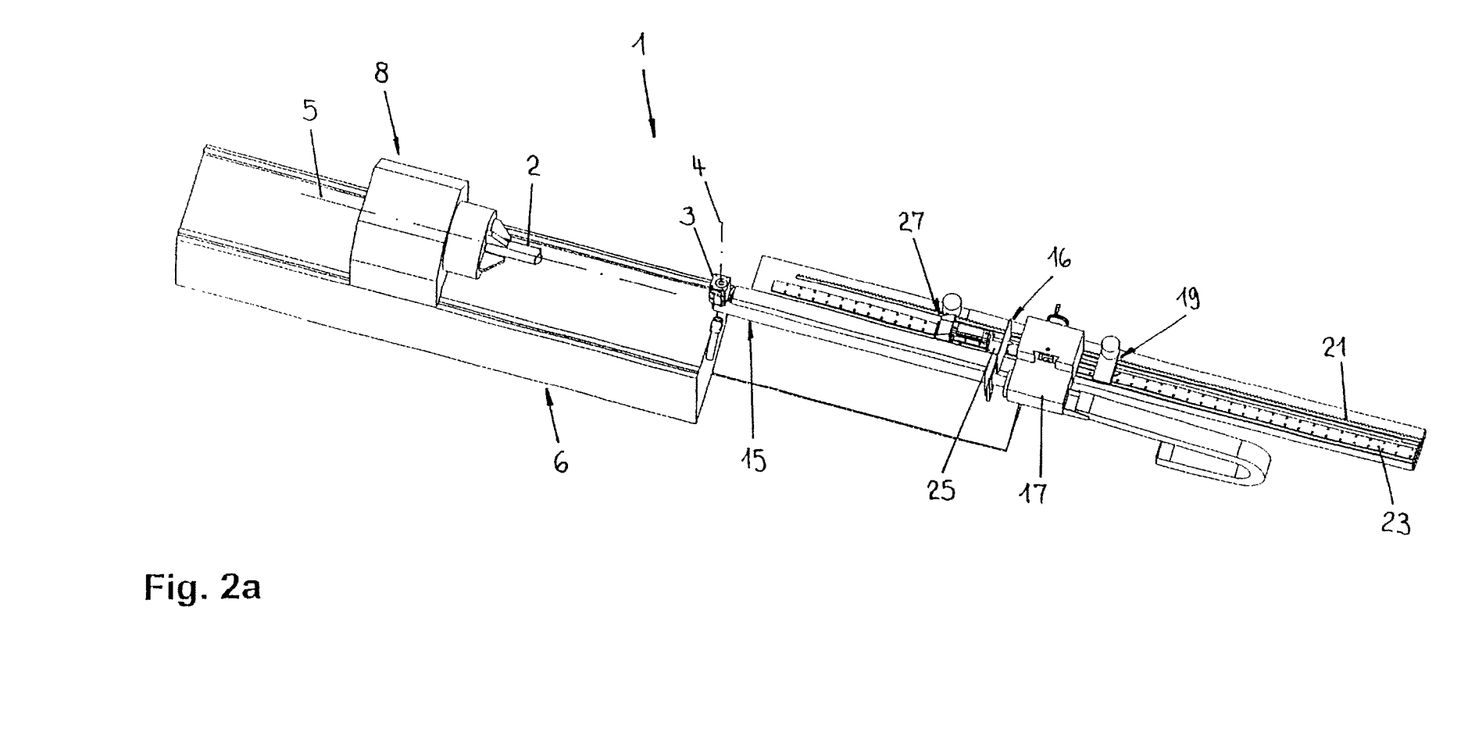
FIGS. 2a and 2b show the mechanical arrangement of FIGS. 1a to 1c in various phases of a second pipe-processing operation.
Figure 2B:
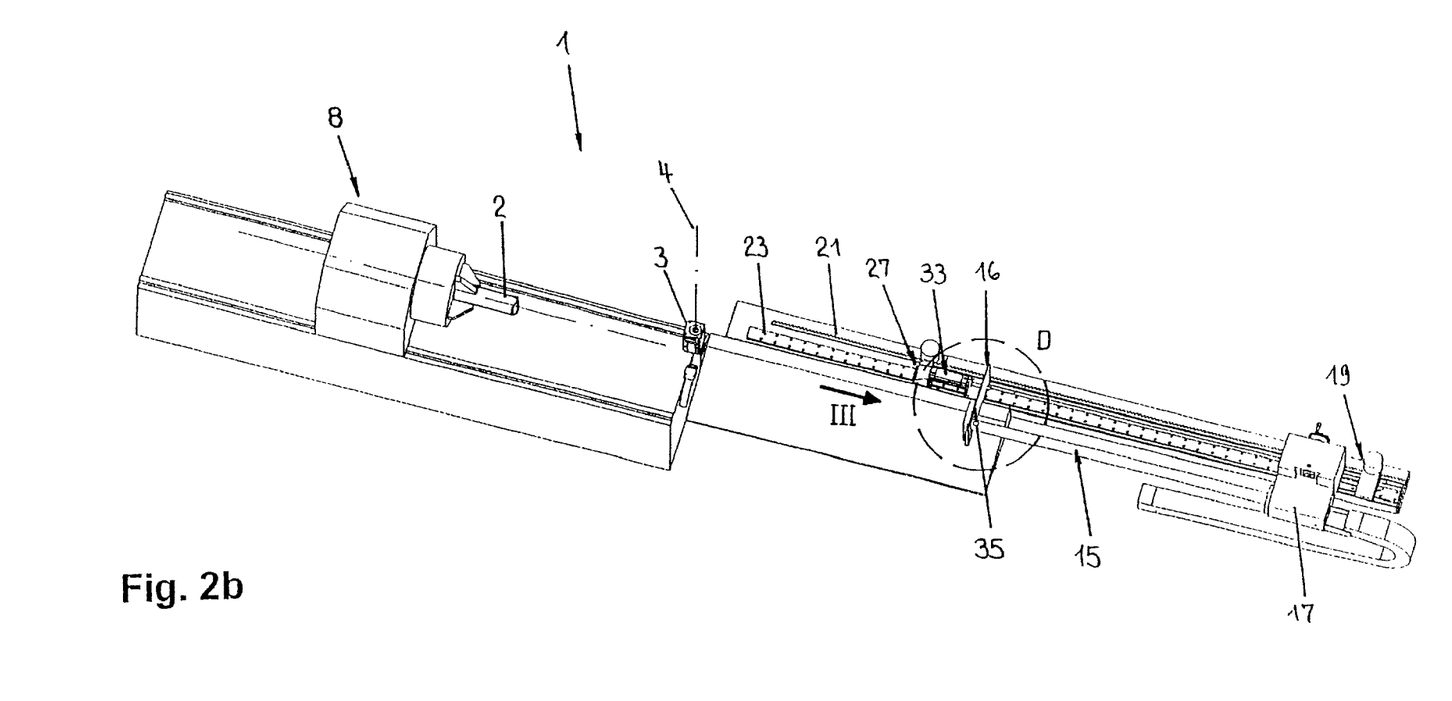

The catcher 15 is provided at its free end with a collecting aperture 35 which can be seen in FIG. 2b. In its construction and mode of operation, the catcher 15 corresponds to the cooling and/or flushing lance described in U.S. 2004/0232120 A1, the full disclosure of which is hereby incorporated by reference. When a pipe is being processed by cutting, the collecting aperture 35 is situated in the interior of the pipe 2 being processed, beneath the processing site of the laser cutting beam. Metal spatter produced in the interior of the pipe passes through the collecting aperture 35 into the interior of the catcher where it is removed with the aid of a flushing medium. The flushing medium is introduced into the catcher 15 and—laden with contaminants—is removed from the catcher 15 via the catcher slide 17. The inlet and outlet lines for the flushing medium are accommodated in a protected manner in the interior of a drag chain 36 fastened to the catcher slide 17.

All the main functions of the laser cutting machine 1 are controlled by means of a numerical arrangement control 37. Integrated into the numerical arrangement control 37 is a positioning control 38 for the stripper 16. The sequence of a first pipe-processing operation will be apparent by reference to FIGS. 1a, 1b and 1c.

The article to be processed in this example is a pipe 2 having a relatively large diameter. Accordingly, the catcher 15, which extends for a time into the interior of the pipe, may also have a relatively large diameter. A large catcher diameter in turn allows a large catcher length, since for the flushing medium in the interior of the catcher it is possible to provide flow cross-sections that permit functionally reliable delivery and removal of flushing medium even over relatively great distances. In addition, a large catcher diameter offers the possibility of providing the catcher 15 with increased inherent rigidity as is to be demanded in the case of a large catcher length.

Figure 1B:
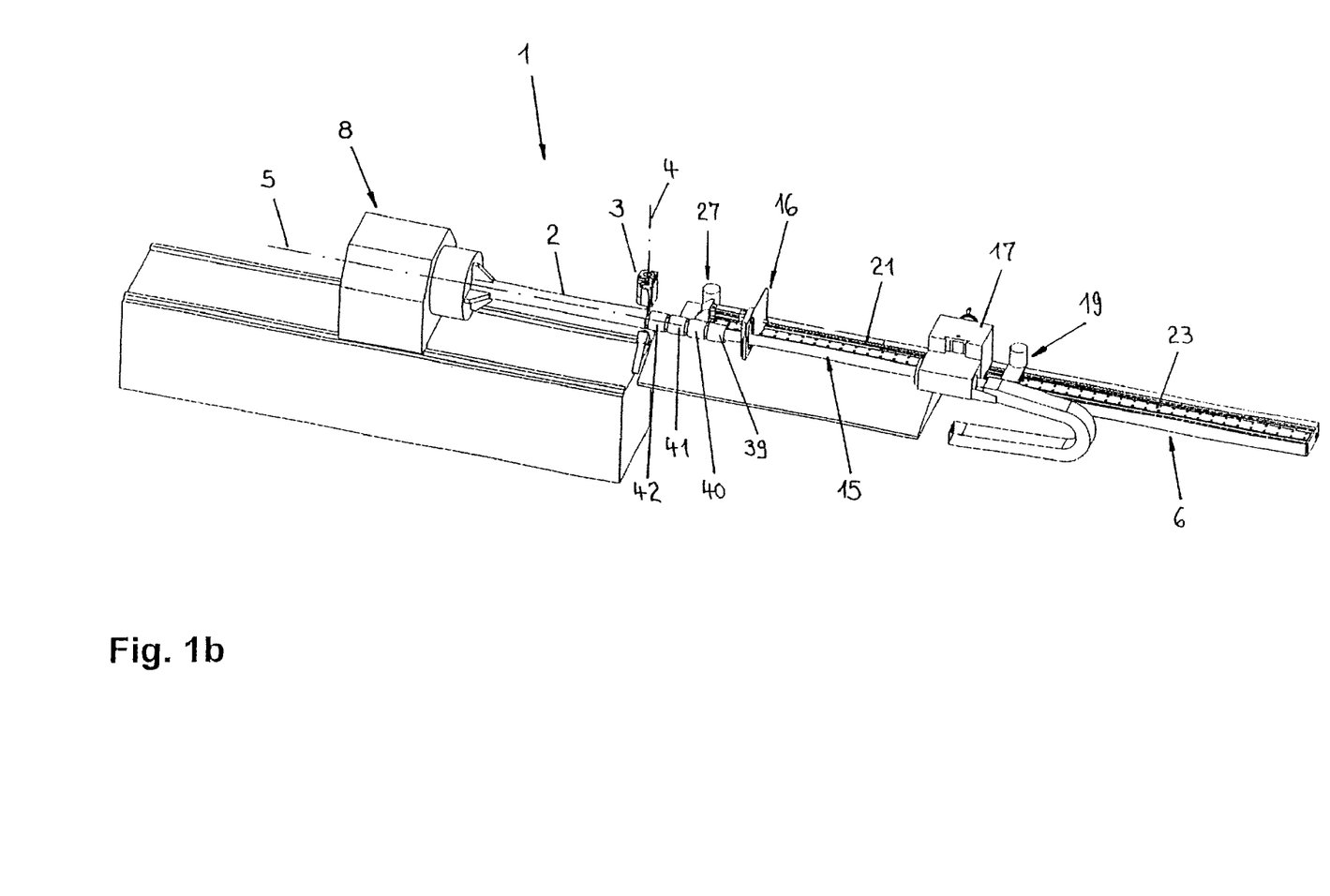

Before processing of the pipe by cutting is commenced, first the catcher 15 and the stripper 16 are positioned in the longitudinal direction 5 of the pipe while the laser cutting beam is switched off. For that purpose, the catcher 15 is arranged in the longitudinal direction of the pipe by means of the motor-powered catcher drive 19 under numerical control of control 37 in such a manner that the processing axis 4 of the laser cutting head 3 passes through the collecting aperture 35 of the catcher 15. The stripper 16 is moved by means of the motor-powered stripper drive 27, which is likewise numerically controlled, by control 38, in the longitudinal direction 5 of the pipe to a position in which it is spaced from the processing axis 4 of the laser cutting head 3 in the longitudinal direction 5 of the pipe by a distance that is matched to the overall length of the finished parts to be unloaded after processing of the pipe. Hence, the projecting length of the catcher 15 relative to the stripper 16 on the cutting heading side is likewise matched to the overall length of the finished parts to be unloaded. In the respective working position adopted, the catcher 15 is releasably locked by way of the drive unit 18, and the stripper 16 is releasably locked by way of the drive unit 26. With the working positions obtained in that manner, the catcher 15 is illustrated in FIGS. 1a and 1b, and the stripper 16 in FIGS. 1a, 1b and 1c.

The rotating/feed station 8 is initially situated in its home position (position indicated by dashed lines in FIG. 1a), which is remote from the cutting head. In that position of the rotating/feed station 8, the pipe 2 to be processed is arranged above the parallel guide 7 of the machine bed 6 in such a manner that it may be gripped at its longitudinal end remote from the cutting head by the chuck 10 of the rotating/feed station 8. With the pipe 2 chucked, the rotating/feed station 8 then travels in the longitudinal direction 5 of the pipe and in so doing in the direction towards the laser cutting head 3. The feed movement of the rotating/feed station 8 comes to an end as soon as the leading end of the pipe 2 projects by the desired amount beyond the processing axis 4 of the laser cutting head 3 towards the unloading side of the laser cutting machine 1. In the course of the feed movement of the pipe 2, the catcher 15 runs into the pipe interior at the free end of the pipe 2.

Now, with the rotating/feed station 8 in a fixed position in the longitudinal direction 5 of the pipe and with the laser cutting beam switched on, the chuck 10 of the rotating/feed station 8, with the pipe 2 fixed thereto, is rotated through 360° in the circumferential direction of the pipe. In that rotational movement, a continuous severing cut in the circumferential direction of the pipe is made in the pipe 2. Contamination of the inside wall of the pipe by metal spatter formed during the cutting operation is prevented by means of the catcher 15. A pipe portion 39 severed from the pipe 2 by the severing cut is automatically deposited under the action of gravity on the catcher 15 (FIG. 1b).

Then, with the laser cutting beam switched off, the pipe 2 is repositioned by moving the rotating/feed station 8 in the direction towards the laser cutting head 3. In the process, the pipe portion 39 threaded on the catcher 15 is pushed by the leading end of the pipe 2 in the direction towards the stripper 16. When the repositioning movement has been completed, with the rotating/feed station 8 stationary in the longitudinal direction 5 of the pipe and with the laser cutting beam switched on, a further severing cut is made by rotating the pipe 2 through 360°. A pipe portion 40 severed in that operation also comes to rest automatically on the catcher 15 (FIG. 1b).

In the example illustrated, the described severing operation is repeated two further times. In those operations, pipe portions 41, 42 are severed and are likewise threaded on the catcher 15. The situation shown in FIG. 1b is thus obtained. The projecting length of the catcher 15 relative to the stripper 16 on the cutting head side is largely occupied by the pipe portions 39, 40, 41, 42.

Figure 1C:
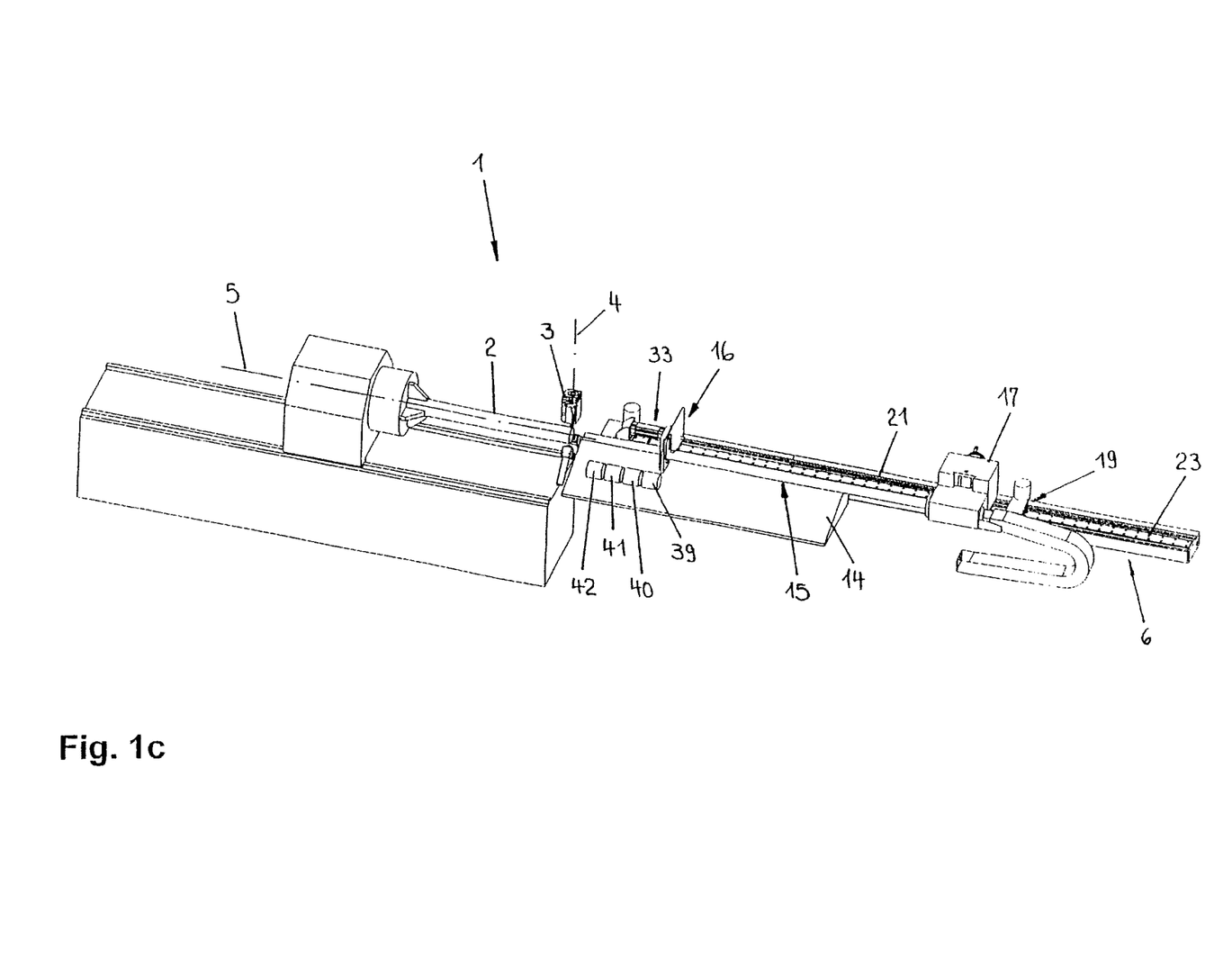

To unload the pipe portions 39, 40, 41, 42, the catcher 15 travels under numerical control out of its working position shown in FIGS. 1a and 1b into the unloading position shown in FIG. 1c. In this operation, the catcher 15 executes a relative movement with respect to the stripper 16. Owing to that relative movement, the pipe portions 39, 40, 41, 42, the diameter of which exceeds the width of the passage 24 in the stripper 16, are stripped off the catcher 15 by means of the stripper 16. The pipe portions 39, 40, 41, 42 fall under the action of gravity onto the unloading ramp 14 from which they are deposited in containers for finished parts, not shown in detail, and are finally removed from the vicinity of the laser cutting machine 1.

The matching of the position adopted by the stripper 16 in the longitudinal direction 5 of the pipe to the overall length of the pipe portions 39, 40, 41, 42 that are to be removed and the associated matching of the projecting length of the catcher 15 relative to the stripper 16 on the cutting head side result in an optimized, that is, relatively short, length of the distance to be traveled by the catcher 15 in order for the pipe portions 39, 40, 41, 42 to be stripped off.

A processing and unloading strategy that differs from the procedure described with reference to FIGS. 1a, 1b and 1c is implemented as shown in FIGS. 2a and 2b. For simplicity, the pipe 2 to be processed is merely suggested in FIGS. 2a and 2b.

In this second example, the pipe 2 is divided over its entire processable length into pipe portions that are to be unloaded together. Consequently, the stripper 16 is arranged under numerical control in a position in which it is spaced from the processing axis 4 of the laser cutting head 3 in the longitudinal direction 5 of the pipe by a greater distance than in the processing situation described with reference to FIGS. 1a, 1b and 1c. The projecting length of the catcher 15 relative to the stripper 16 on the cutting head side when the catcher 15 is in the working position is at its maximum in FIG. 2a and can, for example, amount to around 1500 millimeters. The catcher 15 has to be moved by a corresponding distance to its unloading position shown in FIG. 2b in order to strip off the pipe portions threaded onto the catcher 15 during processing of the pipe.

Figure 3:
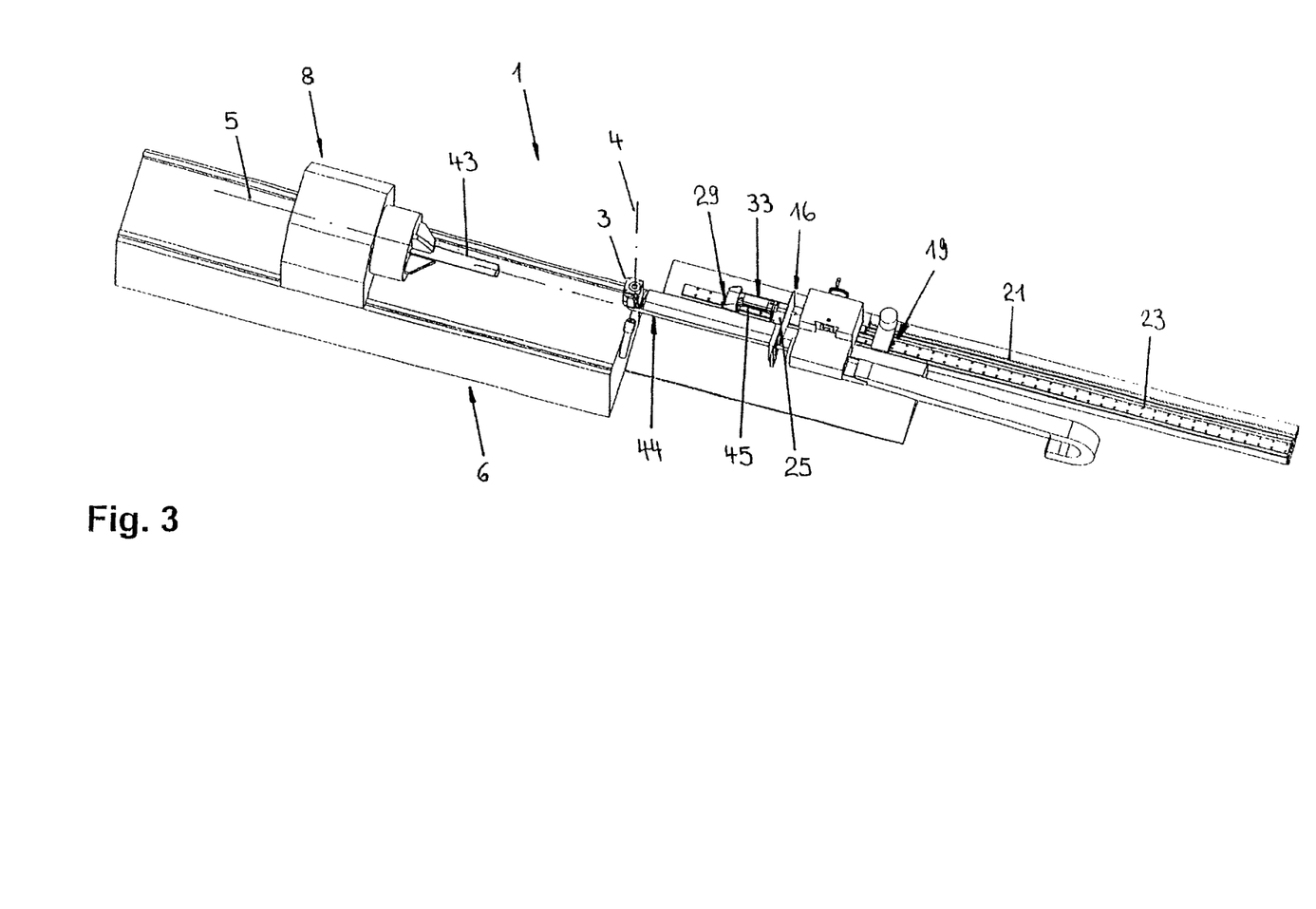
FIG. 3 shows the mechanical arrangement of FIGS. 1a to 2b with a short catching lance and a manual stripper drive.

In FIG. 3, the stripper 16 is shown in a third position relative to the processing axis 4 of the laser cutting head 3. In this example, a sketched pipe 43 is to be processed, the diameter of which is considerably smaller than the diameter of the pipe 2 shown in FIGS. 1a to 2b. The smaller pipe diameter requires a smaller catcher diameter. A correspondingly thin catcher 44 is provided as shown in FIG. 3. A reduced catcher diameter entails in turn a relatively narrow flow cross-section for the flushing medium in the interior of the catcher. Consequently, with a reduced catcher diameter, generally only reduced catcher lengths are practicable.

As shown in FIG. 3 and in conformity with the processing situation shown in FIGS. 2a and 2b, the entire processable length of the pipe 2 is divided into pipe portions, all of which are threaded onto the catcher 44 and which are to be unloaded together. The position shown in FIG. 3 also which is adopted by the stripper 16 in the longitudinal direction 5 of the pipe and the projecting length of the catcher 44 relative to the stripper 16 on the cutting head side are matched to the total length of the pipe portions to be threaded on the catcher 44. Accordingly, the processing situation shown in FIG. 3 likewise results in an optimized travel distance of the catcher 44 when the pipe portions situated on the catcher 44 are unloaded. The maximum length of finished parts that the catcher 44 is capable of accommodating can be, for example, approximately 800 mm.

As a departure from the conditions shown in FIGS. 1a to 2b, the stripper 16 shown in FIG. 3 may be manually positioned in the longitudinal direction 5 of the pipe. A motor-powered stripper drive may therefore be dispensed with. The drive unit 26 of the arrangement shown in FIGS. 1a to 2b is replaced by a slide 45 that does not have its own drive and which is connected to the stripper slide 25 and provided with the cylinder 32 of the overload protection device 33 (FIG. 4). The slide 45 also is guided on the guide rail 23 in the longitudinal direction 5 of the pipe. In the working position, the stripper 16 is releasably locked in the longitudinal direction 5 of the pipe via the slide 45 on the guide rail 23.

In case of malfunctions when the pipe portion(s) is/are being stripped off the catcher 15, 44, the overload protection device 33 is provided. If the pipe portions to be stripped off become jammed on the catcher 15, 44 as it moves in the direction towards its unloading position, the pipe portions are pressed against the stripper 16 with a force that exceeds a retaining force exerted on the stripper 16 and causes a short-travel displacement of the stripper 16 away from the laser cutting head 3. In the process, the stripper slide 25 carrying the stripper 16 moves in guided manner along the guide rail 23 and at the same time relative to the drive unit 26 of the motor-powered stripper drive 27 or—in the case of a manual stripper drive—relative to the slide 45.

Referring to FIG. 4, in the short-travel evading movement, the stripper 16 takes with it, by means of the piston rod 34, the piston which is guided in the interior of the cylinder 32 of the overload protection device 33. The cylinder 32 is effectively fixed in the longitudinal direction of the pipe 5 by means of the drive unit 26 which is locked in the longitudinal direction 5 of the pipe (FIGS. 1a to 2b) or by means of the slide 45 which is locked in the longitudinal direction 5 of the pipe (FIG. 3). In the cylinder chamber in the interior of the cylinder 32, which chamber is delimited by the piston, the movement of the piston rod 34 causes an increase in pressure owing to which the motor-powered catcher drive 19 is automatically shut down by appropriate control means and the catcher slide 17 is stopped.

A number of embodiments of the invention have been described. Nevertheless, it will be understood that various modifications may be made without departing from the spirit and scope of the invention. For example, any of the strippers shown and described herein may be manually positioned.

What is claimed is:

1. A mechanical arrangement for processing pipes by cutting using a cutting beam, the mechanical arrangement comprising:

a cutting head from which a cutting beam may be directed onto a pipe to be processed, along a processing axis of the cutting head and in the transverse direction of the pipe, the cutting beam and the pipe being movable relative to each other in the circumferential direction of the pipe with at least one pipe portion being severed, a pipe holder which, viewed in the longitudinal direction of the pipe, is disposed on a first side of the processing axis of the cutting head and is configured to fix the pipe to be processed, a stripper, disposed on a second side of the processing axis of the cutting head which is opposite the pipe holder in the longitudinal direction of the pipe, a catching lance that is insertable into the interior of the pipe to be processed, on the second side of the processing axis of the cutting head with a projecting length relative to the stripper in the longitudinal direction of the pipe and towards the processing axis of the cutting head, the catching lance being configured to receive at least one severed portion of the pipe on a side of the stripper which is towards the processing axis of the cutting head, and the catching lance being movable relative to the stripper in the longitudinal direction of the pipe with a withdrawal movement away from the processing axis of the cutting head, to strip the pipe portions off the catching device,
wherein the stripper is transferable relative to the processing axis of the cutting head in the longitudinal direction of the pipe to various positions by a positioning movement.

2. A mechanical arrangement according to claim 1 further comprising a longitudinal catching lance guide for the catching lance, configured to guide the catching lance during the movement in the longitudinal direction of the pipe.

3. A mechanical arrangement according to claim 2, further comprising a support structure and a longitudinal guide device disposed on the support structure side, the longitudinal guide device disposed on the support structure forming together with a longitudinal guide device disposed on a stripper slide a longitudinal stripper guide, and forming together with a longitudinal guide device disposed on a catcher slide the longitudinal catching lance guide.

4. A mechanical arrangement according to claim 3, wherein the catching lance is connected to a drive unit of a motor-powered catching lance drive configured to move the catching lance in the longitudinal direction of the pipe, further comprising a longitudinal drive guide for the drive unit of the catching lance drive, the longitudinal drive guide being formed by the longitudinal guide device disposed on the support structure side and by a longitudinal guide device disposed on the drive unit.

5. A mechanical arrangement according to claim 4, wherein at least one of the longitudinal stripper guide, the longitudinal catching lance guide, and the longitudinal drive guide is in the form of a linear guide.

6. A mechanical arrangement according to claim 1, wherein the stripper is transferable to various positions in the longitudinal direction of the pipe by a motor-powered positioning drive.

7. A mechanical arrangement according to claim 6, wherein the catching lance is movable in the longitudinal direction of the pipe by a motor-powered catching lance drive, and a support structure of the mechanical arrangement has a drive device disposed on the support structure, the drive device disposed on the support structure forming together with a drive unit that is coupled to a stripper slide the motor-powered positioning drive of the stripper and forming together with a drive unit that is coupled to a catcher slide the motor-powered catching lance drive.

8. A mechanical arrangement according to claim 1, wherein a numerical position control is provided for the stripper, configured to define the various positions of the stripper in the longitudinal direction of the pipe.

9. A mechanical arrangement according to claim 8, wherein the numerical position control for the stripper is integrated into a numerical arrangement control of the mechanical arrangement, the numerical arrangement control being configured to control all the main functions of the mechanical arrangement.

10. A mechanical arrangement according to claim 1, further comprising a longitudinal stripper guide for the stripper, configured to guide the stripper in the longitudinal direction of the pipe during the positioning movement.

11. A mechanical arrangement according to claim 1, wherein the catching lance is connected to a drive unit of a motor-powered catching lance drive configured to move the catching lance in the longitudinal direction of the pipe.

12. A mechanical arrangement according to claim 1, wherein the stripper is transferable to various positions in the longitudinal direction of the pipe by a manual drive.

13. A mechanical arrangement according to claim 1, further comprising a numerical arrangement control configured to detect the positions adopted by the stripper in the longitudinal direction of the pipe and to control functions of the mechanical arrangement as a function of the detected positions of the stripper.

14. A method of processing pipes by cutting using a cutting beam, the method comprising:
fixing the pipe to be processed in a pipe holder which, viewed in the longitudinal direction of the pipe, is disposed on a first side of the processing axis of the cutting head,
providing a stripper, disposed on a second side of the processing axis of the cutting head which is opposite the pipe holder in the longitudinal direction of the pipe,
inserting a catching lance into the interior of the pipe, on the second side of the processing axis of the cutting head, with a projecting length of the cutting lance relative to the stripper extending in the longitudinal direction of the pipe and towards the processing axis of the cutting head,
effecting relative movement of a cutting head from which a cutting beam may be directed onto the pipe and/or the pipe relative to each other in the circumferential direction of the pipe while directing the cutting beam onto the pipe, with at least one pipe portion being severed,
depositing at least one severed portion of the pipe onto the catching lance on a side of the stripper which is towards the processing axis of the cutting head,
moving the catching lance relative to the stripper in the longitudinal direction of the pipe with a withdrawal movement away from the processing axis of the cutting head, to strip the pipe portions off the catching device, and
transferring the stripper relative to the processing axis of the cutting head in the longitudinal direction of the pipe to various positions by a positioning movement.

15. The method of claim 14 further comprising using a longitudinal stripper guide to guide the stripper in the longitudinal direction of the pipe during the positioning movement.

16. The method of claim 14, wherein transferring the stripper to various positions in the longitudinal direction of the pipe comprises using a manual drive.

17. The method of claim 14, wherein transferring the stripper to various positions in the longitudinal direction of the pipe comprises actuating a motor-powered positioning drive.

18. The method of claim 14, further comprising providing a numerical position control for the stripper, and using the numerical position control to define the various positions of the stripper in the longitudinal direction of the pipe.

* * * * *